(12) United States Patent
Junier

(10) Patent No.: US 6,354,324 B1
(45) Date of Patent: Mar. 12, 2002

(54) SLIDE VALVE WITH WELDED INTERNALS

(75) Inventor: Marius Robert Junier, Houston, TX (US)

(73) Assignee: Tapco International, Inc., Houston, TX (US)

( * ) Notice: Subject to any disclaimer, the term of this patent is extended or adjusted under 35 U.S.C. 154(b) by 0 days.

(21) Appl. No.: 09/600,496
(22) PCT Filed: Jan. 14, 1999
(86) PCT No.: PCT/US99/00825
 § 371 Date: Jul. 12, 2000
 § 102(e) Date: Jul. 12, 2000
(87) PCT Pub. No.: WO99/36715
 PCT Pub. Date: Jul. 22, 1999

Related U.S. Application Data

(63) Continuation-in-part of application No. 09/007,666, filed on Jan. 15, 1998.

(51) Int. Cl.[7] ............................................... F16K 3/30
(52) U.S. Cl. .................. 137/315.27; 137/375; 251/329
(58) Field of Search ................................. 257/326, 327, 257/328, 329; 137/375, 315

(56) References Cited

U.S. PATENT DOCUMENTS

| 3,726,306 | A | * | 4/1973 | Purvis | 251/329 X |
| 3,964,507 | A | * | 6/1976 | Jandrasi et al. | 251/326 X |
| 4,253,487 | A | * | 3/1981 | Worley et al. | 137/375 |
| 4,316,483 | A | * | 2/1982 | Jandrasi et al. | 137/315 |
| 4,458,879 | A | * | 7/1984 | Jandrasi | 251/326 |
| 4,512,363 | A | * | 4/1985 | Jandrasi et al. | 137/375 |
| 4,612,995 | A | * | 9/1986 | Purvis | 137/375 |
| 4,615,506 | A | * | 10/1986 | Houston | 251/326 |
| 4,693,452 | A | * | 9/1987 | Jandrasi | 251/326 X |
| 5,123,440 | A | * | 6/1992 | Houston et al. | 251/326 X |
| 5,301,712 | A | * | 4/1994 | Treichel et al. | 137/375 |
| 5,732,930 | A | * | 3/1998 | Fritz, Jr. | 251/326 X |

* cited by examiner

Primary Examiner—Kevin Shaver
Assistant Examiner—John Bastianelli
(74) Attorney, Agent, or Firm—James F. Weiler

(57) ABSTRACT

A slide valve for control of product flow through it in which the valve internals are maintained in position by a stub welded to the orifice plate which in turn is welded to an internal end of the support cone and may be released and removed through the bonnet area of the slide valve by cutting the weld between the stub and support cone, and replaced through the bonnet area and rewelding the remaining portions of the stub to the support cone.

6 Claims, 1 Drawing Sheet

SLIDE VALVE WITH WELDED INTERNALS

CROSS-REFERENCE TO RELATED APPLICATION

The present application is a continuation-in-part of U.S. application Ser. No. 09/007,666 filed Jan. 15, 1998.

FIELD OF THE INVENTION

The present invention is directed to slide valves utilized for controlling high temperature and high velocity flow.

BACKGROUND OF THE INVENTION

Slide valves utilized in controlling high temperature and high velocity flow of products through the valve have a number of disadvantages—for example, require seat plates and seat plate bolting, have seat plate distortion, and the utilization of bolting that is under load due to differential pressure in the valves and are only as strong as the bolting system strength of bolts resulting in seat plate distortion, do not have a positive seal against by-pass from differential pressure, do not allow for proper alignment of the orifice plate, and do not provide for future expansion of the port opening.

PRIOR ART

The following patents represent the current state of the art with respect to slide valves.

Treichel et al., U.S. Pat. No. 5,301,712, discloses background information concerning slide valves, their applications, problems and the like of slide valves in the field of use of the present invention to which reference is made. It also discloses a slide valve assembly including an orifice and a slide valve slidable in the guides of the orifice plate assembly. The orifice plate assembly is slidable into and out of position in the slide valve housing through a side opening via grooves formed in the inner walls of the housing.

Houston et al., U.S. Pat. No. 5,123,440, discloses a slide valve for use in high temperature environments. The mounting ring of the slide valve is propped against the bed plate by a plurality of columns which are adjustable by screws connecting gussets to rails upon which the slide or disc slides.

Wiese, U.S. Pat. No. 5,096,099, discloses a slide valve with an adjustable cover that is connected at an opening to a container by a plurality of socket head screws.

Owens et al., U.S. Pat. No. 5,082,247, discloses a split seat gate valve located within a length of pipeline. The valve is disposed between flanged openings in the pipeline and is secured by a plurality of bolts.

Jandrasi, U.S. Pat. No. 4,693,452, discloses several embodiments of slide valves for high corrosive environments. In the most relevant embodiments, the orifice plate and guide rails of the slide valve are attached to the valve housing by a plurality of bolts that run parallel to the flow direction to connect the valve assembly.

Purvis, U.S. Pat. No. 4612,955, discloses an edge ear tab used to prevent corrosion around the orifice in high temperature applications. Slides are slidably mounted in rails which are bolted to the valve housing.

Graf et al., U.S. Pat. No. 4,542,453, discloses a slide valve for high temperature gas lines. The internals are removed only by disassembly of the valve housing.

Jandrasi et al., U.S. Pat. No. 4,531,539, discloses a slide valve. The orifice plate of the slide valve is releasably secured in place by bolts running parallel to flow direction.

Jandrasi et al., U.S. Pat. No. 4,512,363, discloses a valve assembly wherein the valve internals (orifice assembly, valve seat, guides, and slide) are removably secured to the valve body by a clamping action. The clamping action is established by a valve liner which engages the orifice assembly and presses it into abutment with the valve body. A lower flange of the liner is removably positioned between the slide valve body and outlet member.

Jandrasi et al., U.S. Pat. No. 4,458,879, discloses a valve wherein the valve internals are held in position by a clamping action of a quick make-up cylinder. The orifice plate with guides for the slide is clamped to the valve body by a quick connect cylinder that screws into the valve body.

Worley et al., U.S. Pat. No. 4,253,487, discloses a slide valve using a pair of opposing discs to control fluid flow through the valve. The guide rails within which the discs slide are held in place by bolts that run parallel to the flow direction.

It would be advantageous to provide a slide valve which eliminates bolting that is under load to differential pressures in the valve, which is much stronger than a bolted system for maintaining the internals in position, which has positive sealing against by-pass from differential pressure, in which no seat plate is utilized thereby eliminating distortion from a seat plate, allows for future expansion of the port, is easier to remove and replace internals rather than one utilizing bolts which often gall, break, or are difficult to remove and replace, in which the internals are maintained properly aligned, and which may be used for all size valves.

SUMMARY OF THE INVENTION

The present invention is directed to such a slide valve in which product flow is controlled through the valve. The internals of the slide valve comprise the orifice plate with a circumferentially-extending stub welded to it, and the guide assembly for the slide or disc, the orifice plate circumferential stub being connected by a weld assembly to an internal support cone which in turn is welded to the valve body. Preferably the orifice plate and the guide assembly are welded together into a monolithic or unitary structure, or the guide assembly is supported by the orifice plate by wrap around guides bolted or pinned to the orifice plate without the bolts or pins bearing any load. The internals, guide assembly, and orifice plate may be removed quickly and easily by cutting a welded connection of the weld assembly to the stubs and replaced by rewelding the stub connection to the support cone. The circumferentially extending stub can be welded either to the inside or outside of the internal end of the support cone. This permits high temperatures (1,000° F.+) and high pressure (50 psi+) transfer of product through the valve assembly having the above advantages and features. Further details and aspects of the slide valve of the present invention are set forth in the following description of preferred embodiments.

Accordingly, it is an object of the present invention to provide such a slide valve which eliminates bolting under load subject to differential pressure in the valve.

It is a further object of the present invention to provide such a slide valve which is much stronger than slide valves using a bolted system to maintain the internals in place in the valve.

It is yet a further object of the present invention to provide such a slide valve which provides a positive seal against by-pass from differential pressure.

A further object of the invention is to provide such a slide valve which eliminates a seat plate and seat plate bolting and hence has no seat plate distortion.

A still further object of the invention is the use of stubs welded to the orifice plate and support cone which allows proper alignment of the port or orifice in the orifice plate.

A still further object of the present invention is the provision of such a slide valve in which the orifice plate and the valve slide are a unitary or monolithic structure.

It is still a further object of the present invention to provide such a slide valve in which the internals are easier to remove and replace than in current slide valves.

A further object of the present invention is that the internal parts are maintained in proper alignment.

It is yet a further object of the present invention to provide such a slide valve which may be utilized for all sizes of valves, which is suited for large, small, and medium sized valves.

Other and further objects, features, and advantages are set forth and are inherent in the slide valve as set forth throughout the specification and claims.

DESCRIPTION OF THE PREFERRED EMBODIMENTS

Figure 1:
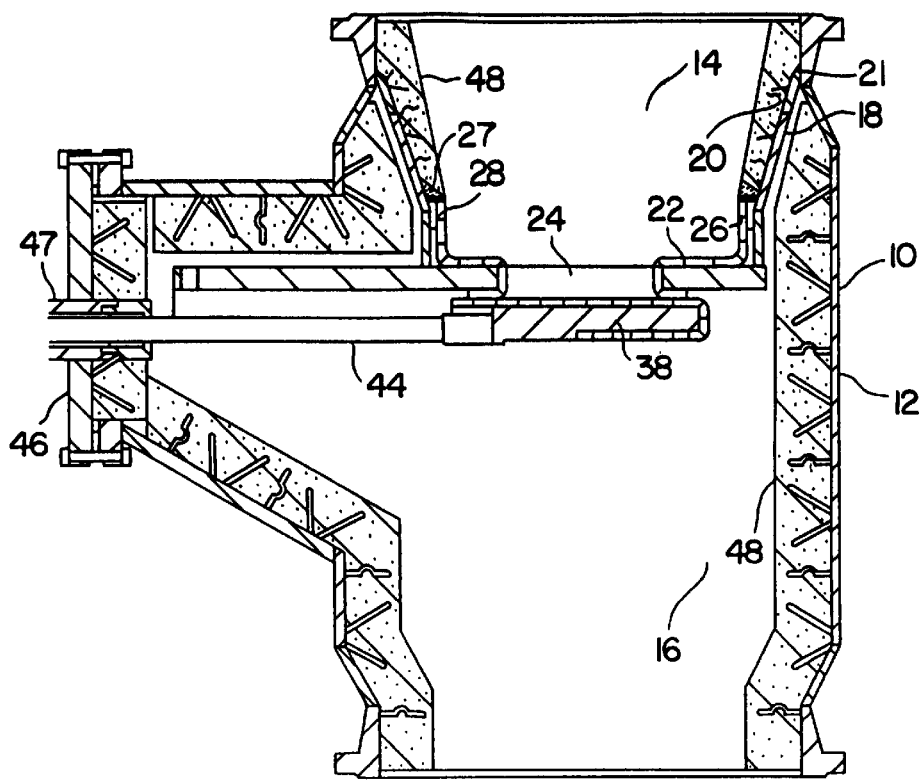
FIG. 1 is a side elevational view in section of a slide valve of the present invention.

Referring to FIG. 1, an improved slide valve 10 of the present invention is illustrated, which includes the valve body 12 which has an upstream entrance area 14 and the downstream outlet area 16. A support cone 18 having the entrance area 20 is welded by the weld 21 to the valve body 12 adjacent its upstream entrance area 14. An orifice plate 22 having the orifice or port 24 and a circumferentially extending flange 26 is welded by the weld 21 to the cone 18.

The lower end of the support cone 18 has the flange 26 welded to it to which the upper end of the circumferential stub 28 is welded by the weld 27 thereby securing the orifice plate 22 to the lower end of the support cone 18.

Figure 2:
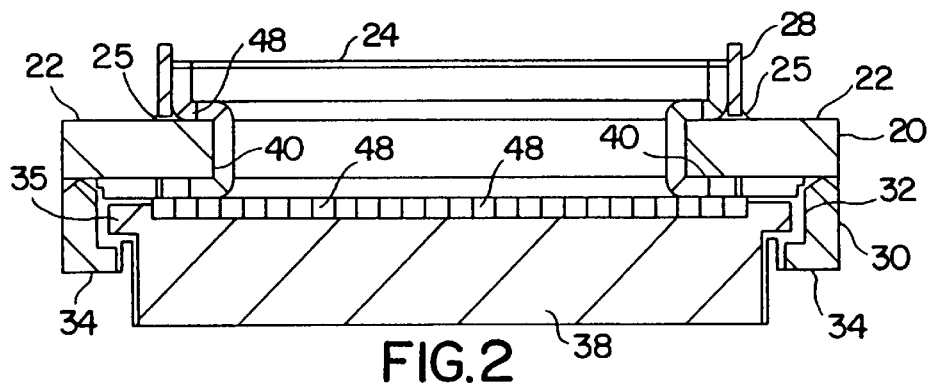
FIG. 2 is a cross-sectional view looking in from the bonnet area of the orifice plate and slide and guide assembly welded together into a monolithic or unitary structure according to the invention.

Referring to FIG. 2, combined by welding to the orifice plate 22 is a guide assembly 30 providing the inwardly facing grooves 32 formed by the inwardly facing projection 34 and the orifice plate 22, the projection 34 coacting with the orifice plate 22 to provide the grooves 32 which serve as guides for the slide 35 on the slide valve assembly 38. Thus, the guide assembly 30 and the orifice plate 22 are welded together by the weld 42 into a unitary or monolithic structure.

The valve internals comprising the monolithic orifice plate 22 and slide and guide assembly 30 are supported in position in the valve body by means of welding the upper portion of the circumferential stub 28 to the lower flange portion 26 of the support cone 18 by the weld 27. Thus, the valve internals may be removed from the slide valve body 12 simply by cutting the weld 27 at the top of the circumferential stub 28 and removing them through the bonnet 46 (FIG. 1), and then can be replaced by reinserting the valve internals, the unitary orifice plate 22 and guide assembly 30, into the valve body 12 through the bonnet 46 (FIG. 1) and rewelding the top of the circumferential stub 28 to the lower connection portion or flange 26 of the support cone 18. Preferably, the circumferential stub 28 is made tall enough so that the weld 27 at the top of the stub 28 may be cut a number of times—for example, four times and replaced and rewelded each of these times.

In operation and referring again to FIG. 1, the slide or disc 38 is reciprocated by an actuator rod 44 which sealingly extends through the bonnet 46. The actuator rod can be actuated by any suitable means, not shown, and has a suitable stuffing box or sealing arrangement 47 for the actuator rod 44 which are conventional in valves of this type; and, accordingly, no description thereof is given or deemed necessary.

Figure 3:
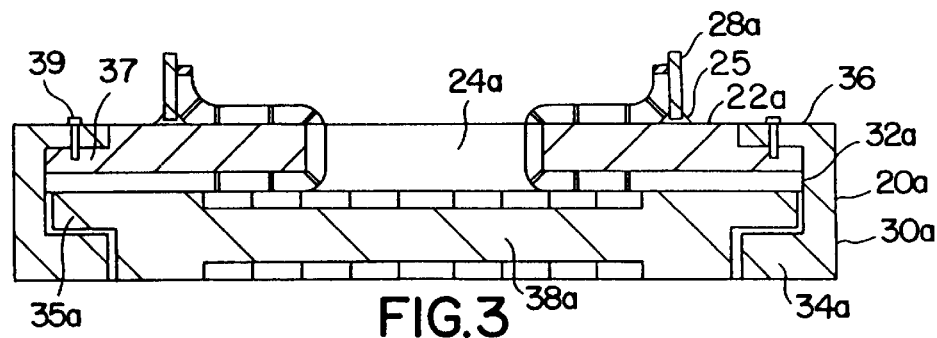
FIG. 3 is a cross-sectional view of a modification of the orifice plate and slide and guide assembly according to the invention.

Referring now to FIG. 3, a modification is shown to the valve slide assembly where like parts to those of FIG. 2 are designated by the same reference numerals with the letter "a" added.

The upper portion of the valve guide assembly 30a has the inwardly-extending projection 36 which is supported on the outer recessed portions 37 of the orifice plate 32a and held in position by the threaded bolts or pins 39. Thus, the guide assembly 30a is supported and held in place by the wrap around projections 34a and 36 and are held in position by bolts or pins 39 which are not under load. The remaining parts and functions of the modification of FIG. 3 are the same as that of FIG. 2, and no further description thereof is deemed necessary or given.

The valve body 12 is lined with refractory material 48 when used at high temperature. Any refractory material having sufficient strength can be used for the liner and is available from a number of suppliers, including Harbison Walker (Pittsburgh, Pa.), National Refractories (Oakland, Calif.), Norton Co. (Worchester, Mass.), The Carborundum Co. (Niagara Falls, N.Y.), Resco Products, Inc. (Morristown, Pa.), Plibrico (Chicago, Ill.), and A. P. Green (Mexico, Mo.). Any such refractory material having a modulus of rupture (MOR) over about 1200 psi at normal operating temperatures (about 1400 to about 1900 psi is preferred) is suitable for use in the present invention; and many commercially available composites can either be modified by adding alumina and/or zirconia to increase MOR or by varying such parameters as aggregate size, cooling rate, pressure, percentable solids, vibration frequency, all as are known in the art, to maximize the strength thereof for use in accordance with the present invention.

Accordingly, the present invention is well suited and adapted to attain the objects and ends and has the advantages and features mentioned as well as others inherent therein.

While presently preferred embodiments of the invention have been given for the purpose of disclosure, changes can be made therein and other uses thereof can be made which are within the spirit of the invention as defined by the scope of the appended claims.

What is claimed is:

1. An improved slide type for control of flow therethrough comprising,
    a body having a valve chamber with an upstream entrance area and a downstream outlet area,
    a support cone having an entrance chamber connected to the body extending to adjacent the upstream entrance of the valve chamber and having a downstream end area extending generally parallel to flow through the body,
    an orifice plate provided with an orifice,
    a circumferentially extending stub welded to the orifice plate extending upwardly around the orifice and welded adjacent to an internal end of the support cone, a guide assembly having a guide plate with an orifice in alignment with the orifice of the orifice plate secured to the orifice plate, the guide assembly having inwardly extending guides, a valve slide having outwardly extending slides disposed in the inwardly extending guides, whereby the orifice plate, guide assembly, and the slide valve can be released as a unit by cutting the weld connection of the stub to the internal end of the support cone and withdrawn through the bonnet area, and replaced through the bonnet area and welding the remaining upper end of the stub to the lower end of the support cone.

2. The improved slide valve of claim 1 including, a lining of refractory material forming a flow-way therethrough lining inner walls of the body, the support cone, and the slide valve.

3. The improved slide valve of claim 1 where, the inlet is cone shaped and extends downwardly and inwardly to adjacent the orifice plate.

4. The improved slide valve of claim 1 where, the orifice plate and guide assembly are a monolithic structure.

5. The improved slide valve of claim 1 where, the orifice plate and guide assembly are welded into a unitary structure.

6. The improved slide valve of claim 1 where, the guides of the guide assembly include upstream and downstream inwardly-extending projections, the upstream projections extending over the orifice plate short of the orifice effective to support the guide assembly against load and pins or bolts securing the upstream projections and thereby the guide assembly to the orifice plate free of load, the downstream inwardly projections and downstream side of the orifice plate slidably receiving the slides of the slide valve.

* * * * *